(12) United States Patent
Davood Abadi Farahani et al.

(10) Patent No.: US 12,343,685 B2
(45) Date of Patent: Jul. 1, 2025

(54) CROSS-LINKED POLYMERIC MEMBRANE

(71) Applicant: NATIONAL UNIVERSITY OF SINGAPORE, Singapore (SG)

(72) Inventors: Mohammad Hossein Davood Abadi Farahani, Singapore (SG); Tai-Shung Chung, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 917 days.

(21) Appl. No.: 17/049,783

(22) PCT Filed: Apr. 18, 2019

(86) PCT No.: PCT/SG2019/050221
§ 371 (c)(1),
(2) Date: Oct. 22, 2020

(87) PCT Pub. No.: WO2019/209177
PCT Pub. Date: Oct. 31, 2019

(65) Prior Publication Data
US 2021/0236998 A1  Aug. 5, 2021

(30) Foreign Application Priority Data

Apr. 24, 2018  (SG) .......................... 10201803406W

(51) Int. Cl.
*B01D 67/00* (2006.01)
*B01D 61/02* (2006.01)
(Continued)

(52) U.S. Cl.
CPC ..... *B01D 67/00931* (2022.08); *B01D 61/027* (2013.01); *B01D 69/02* (2013.01);
(Continued)

(58) Field of Classification Search
CPC ............ B01D 67/00931; B01D 61/027; B01D 69/02; B01D 71/62; B01D 2323/30;
(Continued)

(56) References Cited

U.S. PATENT DOCUMENTS 4,020,142 A  4/1977  Davis et al.
4,360,434 A  11/1982  Kawaguchi et al.
(Continued)

FOREIGN PATENT DOCUMENTS

CN  101862604 A  10/2010
JP  S54158379 A  12/1979
(Continued)

OTHER PUBLICATIONS

M.N. Hyder et al., Composite poly(vinyl alcohol)-poly(sulfone) membranes crosslinked by trimesoyl chloride: Characterization and dehydration of ethylene glycol/water mixtures, Journal of Membrane Science 326 (2009) 363-371. (Year: 2009).*
(Continued)

*Primary Examiner* — Pranav N Patel
(74) *Attorney, Agent, or Firm* — Harness, Dickey & Pierce, P.L.C.

(57) ABSTRACT

There is provided a method of forming a cross-linked polymeric membrane, the method comprising: providing a polymeric membrane; and contacting the polymeric membrane with a cross-linking solution comprising at least one cross-linker to form the cross-linked polymeric membrane, wherein the at least one cross-linker comprises at least three halide-containing groups. There is also provided a cross-linked polymeric membrane.

8 Claims, 8 Drawing Sheets

(51) Int. Cl.
- B01D 69/02 (2006.01)
- B01D 71/62 (2006.01)
- C08J 5/18 (2006.01)
- H01M 8/103 (2016.01)
- H01M 8/10 (2016.01)

(52) U.S. Cl.
CPC ............... B01D 71/62 (2013.01); C08J 5/18 (2013.01); H01M 8/103 (2013.01); B01D 2323/30 (2013.01); B01D 2325/023 (2013.01); B01D 2325/04 (2013.01); B01D 2325/36 (2013.01); C08J 2379/04 (2013.01); H01M 2008/1095 (2013.01); H01M 2300/0082 (2013.01)

(58) Field of Classification Search
CPC .......... B01D 2325/023; B01D 2325/04; B01D 2325/36; B01D 2323/2182; B01D 67/0093; C08J 5/18; C08J 2379/04; H01M 8/103; H01M 2008/1095; H01M 2300/0082; Y02E 60/50

See application file for complete search history.

(56) References Cited

U.S. PATENT DOCUMENTS

| | | | |
|---|---|---|---|
| 4,388,189 | A | 6/1983 | Kawaguchi et al. |
| 6,986,844 | B2 | 1/2006 | Barss et al. |
| 2003/0159980 | A1 | 8/2003 | Barss et al. |
| 2013/0112618 | A1 | 5/2013 | Diallo et al. |
| 2014/0008292 | A1 | 1/2014 | Wang et al. |
| 2016/0207007 | A1* | 7/2016 | Zhang .................... B01D 71/08 |
| 2019/0176092 | A1* | 6/2019 | Livingston ......... B01D 67/0016 |
| 2019/0358593 | A1* | 11/2019 | Staudt .................. B01D 69/125 |

FOREIGN PATENT DOCUMENTS

| | | |
|---|---|---|
| JP | S55097204 A | 7/1980 |
| JP | S56095304 A | 8/1981 |
| JP | S63130105 A | 6/1988 |
| JP | 2000325765 A | 11/2000 |
| JP | 2013532578 A | 8/2013 |
| WO | WO-2016194711 A1 | 12/2016 |
| WO | 2017212246 A1 | 12/2017 |
| WO | 2018026743 A1 | 2/2018 |

OTHER PUBLICATIONS

Xiao et al., Trimesoyl chloride crosslinked chitosan membranes for CO2/N2 separation and pervaporation dehydration of isopropanol, Journal of Membrane Science 306 (2007) 36-46. (Year: 2007).*

X Hai Y.Y. et al., Thin film composite nanofiltration membrane prepared by the interfacial polymerization of 1,2,4,5-benzene tetracarbonyl chloride on the mixed amines cross-linked poly(ether imide) support. Journal of Membrane Science, Jul. 27, 2016, vol. 520, pp. 19-28 [Retrieved on Jul. 11, 2019] <DOI: 10.1016/J.MEMSCI.2016.07.050>.

Farahani M.H.D.A. and Chung T.S., A novel crosslinking technique towards the fabrication of high-flux polybenzimidazole (RBI) membranes for organic solvent nanofiltration (OSN). Separation and Purification Technology, Jul. 20, 2018, vol. 209, pp. 182-192 [Retrieved on Jul. 11, 2019] <DOI: 10.1016/J.SEPPUR.2018.07.026>.

International Search Report and Written Opinion of the International Searching Authority issued in PCT/SG2019/050221, mailed Jul. 18, 2018; ISA/SG.

First Office Action issued Dec. 26, 2022 for corresponding Japanese Application No. 2020-555061 with English language translation; 27 pages.

First Office Action of corresponding China Patent Application No. 201980027149.X issued Jan. 14, 2022 with English translation (24 pages).

Search Report and Written Opinion issued in corresponding Singapore Patent Application No. 11202008463W issued Nov. 1, 2021 (10 pages).

Xiao, et al., "Trimesoyl chloride crosslinked chitosan membranes for CO2/N2 separation and pervaporation dehydration of isopropanol," Journal of Membrane Science, Elsevier BV, NL, vol. 306, No. 1-2 dated Nov. 7, 2007 pp. 36-46.

Hyder M.N. et al., "Composite poly (vinyl alcohol)-poly (sulfone) membranes crosslinked by trimesoyl chloride: Characterization and dehydration of ethylene glycol-water mixtures," Journal of Membrane Science, Elesevier BV, NL, vol. 326, No. 2, Jan. 20, 2009, pp. 363-371.

Supplemental European Search Report from EP19793745 dated Dec. 14, 2021. (9 pages).

First Office Action for Canadian Patent Application No. 3,098,111 issued Dec. 20, 2024; 3 pages.

* cited by examiner

CROSS-LINKED POLYMERIC MEMBRANE

CROSS REFERENCE TO RELATED APPLICATIONS

This application is a U.S. National Phase Application under 35 U.S.C. 371 of International Application No. PCT/SG2019/050221 filed on Apr. 18, 2019, which claims the benefit of priority from Republic of Singapore Patent Application No. 10201803406W filed on Apr. 24, 2018. The entire disclosures of all of the above applications are incorporated herein by reference.

TECHNICAL FIELD

The present invention relates to a method of forming a cross-linked polymeric membrane and a cross-linked polymeric membrane formed from the method.

BACKGROUND

Organic solvent nanofiltration (OSN) is an emerging membrane-based separation technology which can be directly employed in current manufacturing systems. OSN is a cost-effective separation technique as compared to adsorption, flash chromatography, evaporation, and distillation which are usually energy intensive, use high temperatures, and/or use a large amount of solvents thereby leading to higher production costs and environmental concerns, and result in lower quality products.

Regardless of its advantages, OSN still experiences some shortcomings. For example, the chemical stability of OSN membranes in harsh organic solvents is a concern to industrial users. While polybenzimidazole (PBI) membranes have been envisaged, since these membranes are chemically stable and exhibit good rejection rates, most of the methods of manufacturing PBI membranes utilise hazardous and toxic solvents and chemicals.

There is therefore a need for an improved method of forming membranes, particularly for OSN applications, which is low-cost, environmentally friendly and easily scalable.

SUMMARY OF THE INVENTION

The present invention seeks to address these problems, and/or to provide an improved method for forming a polymeric membrane, particularly a polymeric membrane suitable for, but not limited to, organic solvent nanofiltration.

According to a first aspect, the present invention provides a method of forming a cross-linked polymeric membrane comprising:
  providing a polymeric membrane; and
  contacting the polymeric membrane with a cross-linking solution comprising at least one cross-linker to form the cross-linked polymeric membrane,
  wherein the at least one cross-linker comprises at least three halide-containing groups.

According to a particular aspect, the polymeric membrane may be formed from at least one polymer. In particular, the at least one polymer may comprise at least one pyrrolic nitrogen group. For example, the at least one polymer may be, but not limited to: polybenzimidazole (PBI).

The cross-linker comprised in the cross-linking solution may be any suitable cross-linker. According to a particular aspect, the at least one cross-linker may comprise at least three acyl halide groups. For example, the at least one cross-linker may be, but not limited to: trimesoyl chloride (TMC).

The at least one cross-linker may be dissolved in a suitable solvent in the cross-linking solution. The solvent may be, but not limited to, 2-methyl tetrahydrofuran (2-MeTHF), tetrahydrofuran (THF), cyclopentyl methyl ether (CPME), or mixtures thereof.

The method may further comprise forming the polymeric membrane from a polymeric solution comprising the at least one polymer.

The polymeric solution may comprise a suitable amount of the at least one polymer. In particular, the polymeric solution may comprise 2-40% (weight/weight) of the at least one polymer.

The cross-linking solution may comprise a suitable amount of the at least one cross-linker. In particular, the cross-linking solution may comprise 0.05-20% (weight/weight) of the at least one cross-linker.

According to a particular aspect, the contacting may be for a pre-determined period of time and at a pre-determined temperature. For example, the pre-determined temperature may be 10-40° C. For example, the pre-determined period of time may be 0.5-120 hours.

The polymeric membrane may be, but not limited to, a flat-sheet membrane, a hollow fibre membrane, a tubular membrane, or a dense membrane.

According to a particular aspect, the cross-linked polymeric membrane may have a thickness of 1-1000 m.

According to another particular aspect, the cross-linked polymeric membrane may be hydrophilic.

According to a second aspect, there is provided a cross-linked polymeric membrane prepared from a method of the first aspect.

The present invention also provides a cross-linked polymeric membrane comprising a polymeric membrane cross-linked by a cross-linker comprising at least three halide-containing groups, wherein the polymeric membrane is formed from a polymer comprising at least one pyrrolic nitrogen group.

The cross-linker may be any suitable cross-linker. According to a particular aspect, the cross-linker may be as described above.

The polymeric membrane may be any suitable polymeric membrane. According to a particular aspect, the polymeric membrane may be as described above.

The polymer may be any suitable polymer. According to a particular aspect, the polymer may be as described above.

The cross-linked polymeric membrane may preferentially reject solutes with molecular weights in the range of 150-2000 g/mole in a feed stream solution containing at least one organic solvent and one dissolved solute.

According to a particular aspect, the cross-linked polymeric membrane may be stable in an organic solvent.

According to a particular aspect, the cross-linked polymeric membrane may be hydrophilic.

The cross-linked polymeric membrane may have a thickness of 1-1000 m.

According to a particular aspect, the cross-linked polymeric membrane may be for use in organic solvent nanofiltration (OSN), gas separation, aqueous solution separation, pervaporation, and fuel cells.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

Figure 1:
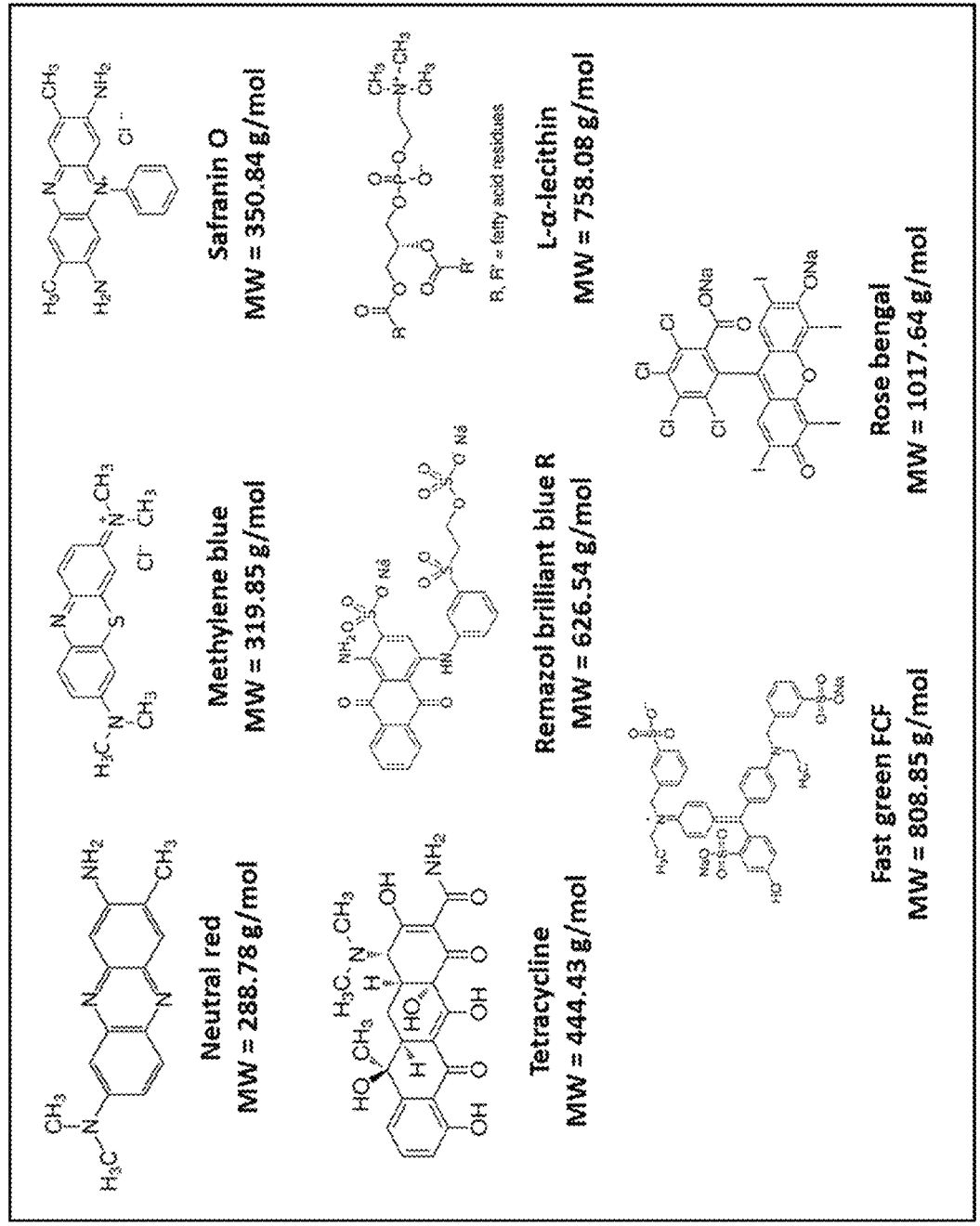
FIG. 1 shows the molecular structures of model solutes used in OSN tests.

As explained above, there is a need for an improved method for preparing membranes, particularly suitable for organic solvent nanofiltration (OSN) among other applications.

Membrane separation processes, namely organic solvent nanofiltration, gas separation, fuel cell, aqueous solution separation and pervaporation are considered to be energy efficient and beneficial processes in fine-chemical, food, pharmaceutical, petrochemical and petroleum industries. These processes require a stable and high-performance membrane.

In general terms, the invention relates to a cross-linked polymeric membrane and a method of forming the same. In particular, the cross-linked polymeric membrane may be for, but not limited to, organic solvent nanofiltration. The method of the present invention may be an environmentally-friendly method. In particular, the method does not utilise any hazardous or toxic solvents and chemicals. Further, the method of the present invention may be a simple method and may be carried out at room temperature, therefore no heating is required. In this way, the overall cost of the method may be reduced.

According to a first aspect, the present invention provides a method of forming a cross-linked polymeric membrane comprising:

providing a polymeric membrane; and
contacting the polymeric membrane with a cross-linking solution comprising at least one cross-linker to form the cross-linked polymeric membrane, wherein the at least one cross-linker comprises at least three halide-containing groups.

The polymeric membrane may be formed from at least one polymer. The polymer may be any suitable polymer. For example, the polymer may comprise at least one pyrrolic nitrogen (—NH—) group. For example, the at least one polymer may be, but not limited to: polybenzimidazole (PBI).

The method may further comprise forming the polymeric membrane from a polymeric solution comprising the at least one polymer prior to the providing.

For example, the at least one polymer may be dissolved in a suitable solvent to form the polymeric solution. According to a particular aspect, the method may further comprise preparing the polymeric solution prior to the forming a polymeric membrane, wherein the preparing comprises mixing the at least one polymer in a first solvent. The first solvent may be any suitable solvent. For example, the first solvent may be any solvent in which the at least one polymer may dissolve, and which is compatible to membrane applications. For example, the solvent may be dimethylacetamide (DMAc), N-methyl-2-pyrrolidinone (NMP), 1-ethyl-3-methylimidazolium acetate ([EMIM]-OAc), or mixtures thereof. According to a particular embodiment, the polymeric solution may comprise PBI dissolved in DMAc.

The polymeric solution may comprise a suitable amount of the at least one polymer. For example, the polymeric solution may comprise 2-40% (weight/weight (w/w)) of the at least one polymer. In particular, the polymeric solution may comprise 5-30 w/w %, 7-25 w/w %, 10-22 w/w %, 12-20 w/w %, 15-17 w/w % of the at least one polymer. Even more in particular, the polymeric solution may comprise about 15-17 w/w % of the at least one polymer.

The polymeric membrane may be, but not limited to, a flat-sheet membrane, a hollow fibre membrane, a tubular membrane, or a dense membrane. The polymeric membrane may be an integrally skinned asymmetric membrane. The forming a polymeric membrane may comprise any suitable method of preparing a polymeric membrane. For example, if the polymeric membrane is a hollow fibre membrane, the forming may comprise spinning the polymeric solution under suitable conditions. For example, if the polymeric membrane is a dense membrane, the forming may comprise a solvent evaporation method under suitable conditions. According to a particular embodiment, the forming may comprise a non-solvent induced phase separation (NIPS) technique.

The cross-linker comprised in the cross-linking solution may be any suitable cross-linker. The cross-linker may comprise at least three halide-containing groups, for example, the halide containing group may be a chlorine- or bromine-containing group or a group containing a mixture of halides. According to a particular aspect, the at least one cross-linker may comprise at least three acyl halide groups. In particular, the at least one cross-linker may comprise at least three acyl chloride group. The cross-linker may be environmentally friendly and non-toxic. For example, the at least one cross-linker may be, but not limited to: trimesoyl chloride (TMC).

The at least one cross-linker may be dissolved in a suitable solvent to form the cross-linking solution. According to a particular aspect, the method may further comprise preparing the cross-linking solution prior to the contacting, wherein the preparing comprises mixing the at least one cross-linker in a second solvent. The second solvent may be any suitable solvent. In particular, the second solvent may be any solvent in which the at least one cross-linker may dissolve, and which is compatible to membrane applications. The second solvent may be environmentally friendly and non-toxic. For example, the solvent may be, but not limited to, 2-methyl tetrahydrofuran (2-MeTHF), tetrahydrofuran (THF), cyclopentyl methyl ether (CPME), or mixtures thereof. According to a particular embodiment, the cross-linking solution may comprise TMC dissolved in 2-MeTHF.

The cross-linking solution may comprise a suitable amount of the at least one cross-linker. For example, the cross-linking solution may comprise 0.05-20% (weight/weight (w/w)) of the at least one cross-linker. In particular, the cross-linking solution may comprise 0.1-15 w/w %, 0.5-12 w/w %, 1-10 w/w %, 2-8 w/w %, 3-7 w/w %, 4-5 w/w % of the at least one cross-linker. Even more in particular, the cross-linking solution may comprise about 0.1-2 w/w % of the at least one cross-linker.

The contacting may comprise any suitable method in order to cross-link the polymeric membrane with the cross-linking solution. The contacting may comprise cross-linking the polymeric membrane such that the entire polymeric membrane is cross-linked. For example, the contacting may comprise immersing the polymeric membrane in the cross-linking solution.

The contacting may be at a pre-determined temperature. For example, the contacting may be at room temperature. According to a particular aspect, the contacting may be without application of any heat. For example, the pre-determined temperature may be 10-40° C. In particular, the pre-determined temperature may be 12-38° C., 15-35° C., 20-30° C., 22-29° C., 24-28° C., 25-27° C. Even more in particular, the pre-determined temperature may be 22-25° C.

The contacting may be for a pre-determined period of time. For example, the contacting may be for a suitable period of time to enable the polymeric membrane to be fully cross-linked. For example, the pre-determined period of time may be 0.5-120 hours. In particular, the pre-determined period of time may be 0.5-90 hours, 1-60 hours, 5-50 hours, 10-48 hours, 12-24 hours. Even more in particular, the pre-determined period of time may be about 24 hours.

The method may further comprise washing the cross-linked polymeric membrane. The washing may be with a suitable solvent. For example, the washing may be with the second solvent as described above.

According to a particular aspect, the cross-linked polymeric membrane may have a thickness of 1-1000 m.

The cross-linked polymeric membrane may be hydrophilic. In particular, the static water contact angle of the cross-linked polymeric membrane may be 50-100°. Even more in particular, the static water contact angle of the cross-linked polymeric membrane may be 60-70°.

Most of the prior art methods PBI cross-linking methods need either multiple steps, elevated temperatures, or utilizing of hazardous chemicals. In contrast, the method of the present invention may be carried out at room temperature, comprises a single cross-linking step and utilises an environmentally-friendly cross-linking technique which may be easily scaled-up. Accordingly, the method of the present invention may be suitable for preparing PBI-based OSN membranes.

Cross-linking PBI or any other polymer which contains at least one pyrrolic nitrogen (—NH—) group with one cross-linker or mixture of cross-linkers which include at least three halide-containing groups (e.g. bromides, chlorides) will improve the performance of the membranes in case of stability and performance because of the desired steric hindrance in case of using cross-linker with at least three halide groups. The pyrrolic nitrogen group may be changed to graphitic nitrogen (—N<) group by cross-linking with the halide containing cross-linker.

In particular, for the embodiment in which the polymer comprised in the polymeric solution is PBI and the cross-linking solution is TMC dissolved in 2-MeTHF, the reaction between the three acyl chloride groups of TMC and the secondary amines on imidazole rings of PBI can result in tertiary amide groups and thus cross-link the PBI chains. Diffusion of the TMC molecules into the PBI membrane may be facilitated by the environmentally and non-toxic solution comprising TMC and 2-MeTHF. TMC also comprises three C=O groups. Since all the acyl chloride groups can react with PBI, this results in a desired steric hindrance. Moreover, higher hydrophilicity may be achieved due to the presence of the three C=O groups.

According to a second aspect, there is provided a cross-linked polymeric membrane prepared from a method of the first aspect.

A third aspect of the present invention provides a cross-linked polymeric membrane cross-linked by at least one cross-linker comprising at least three halide-containing groups, wherein the polymeric membrane is formed from at least one polymer comprising at least one pyrrolic nitrogen group.

The polymeric membrane may be formed from any suitable polymer. For example, the at least one polymer may be, but not limited to: polybenzimidazole (PBI).

The polymeric membrane may be, but not limited to, a flat-sheet membrane, a hollow fibre membrane, a tubular membrane, or a dense membrane. The polymeric membrane may be an integrally skinned asymmetric membrane.

The cross-linker may be any suitable cross-linker. The cross-linker may comprise at least three halide-containing groups, for example, the halide-containing group may be a chlorine- or bromine-containing group or a group containing a mixture of halides. According to a particular aspect, the at least one cross-linker may comprise at least three acyl halide groups. In particular, the at least one cross-linker may comprise at least three acyl chloride group. The cross-linker may be environmentally friendly and non-toxic. For example, the at least one cross-linker may be, but not limited to: trimesoyl chloride (TMC).

The cross-linked polymeric membrane may preferentially reject solutes with molecular weights in the range of 150-2000 g/mole in a feed stream solution containing at least one organic solvent and one dissolved solute. This makes the cross-linked polymeric membrane very useful in many separation applications.

According to a particular aspect, the cross-linked polymeric membrane may be stable in an organic solvent. For the purposes of the present invention, stable is defined as a membrane comprising a gel content of at least 80% when immersed in an organic solvent for at least one week.

According to a particular aspect, the cross-linked polymeric membrane may be hydrophilic.

The cross-linked polymeric membrane may have a suitable thickness. For example, the cross-linked polymeric membrane may have a thickness of 1-1000 m.

The cross-linked polymeric membrane may be for use in many different applications, such as, but not limited to, organic solvent nanofiltration (OSN), gas separation, aqueous solution separation, pervaporation, and fuel cells.

Having now generally described the invention, the same will be more readily understood through reference to the following embodiment which is provided by way of illustration, and is not intended to be limiting.

Example

Chemicals and Materials

Celazole® S26 polybenzimidazole (PBI) solution was provided by PBI Performance Products Inc. (USA). The solution contained 26.2 wt. % PBI and 1.5 wt. % lithium chloride (stabilizer) in N,N-dimethylacetamide (DMAc). Nonwoven polypropylene fabrics Novatexx 2472 were from Freudenberg Filtration Technologies (Germany). All solvents such as DMAc (Sigma), acetonitrile (MeCN, VWR), acetone (VWR), ethanol (EtOH, VWR), isopropanol (IPA, VWR), and DMF (Sigma) were used as received. The chemicals for cross-linking were TMC (cross-linker), anhydrous tetrahydrofuran (THF) (cross-linking media), and anhydrous 2-MeTHF (cross-linking media) from Sigma. Rose bengal, fast green FCF, Remazol brilliant blue R (RBB), tetracycline, safranin O, methylene blue, neutral red (NR), and L-α-Phosphatidylcholine (L-α-lecithin, a mixture of phosphatidylcholine and phosphatides) were procured from Sigma and employed as model solutes for the rejection and application tests of the fabricated membranes. Their molecular structures and molecular weights (MW) are displayed in FIG. 1.

Fabrication of Cross-Linked PBI Membranes

The non-solvent induced phase separation (NIPS) technique was utilized to fabricate integrally skinned asymmetric PBI membranes. A Celazole® S26 PBI solution was diluted with DMAc to a PBI concentration of 17 wt. % and stirred continuously at room temperature until a homogeneous dope solution was obtained. The dope solution was then left overnight to remove air bubbles. Membranes were cast on polypropylene nonwoven fabrics using an adjustable casting knife (BYK-Gardner GmbH, Germany) with a gap of 250 m. Subsequently, the nascent membranes were immersed in a water coagulation bath at room temperature and kept in deionized (DI) water for 2 days. The PBI membranes were subsequently solvent exchanged with either THF or 2-MeTHF thrice, each time for 30 minutes to remove the residual water.

To cross-link PBI membranes with TMC, 1.0 mmol of TMC was dissolved in 10 mL of THF or 2-MeTHF, and then about 100 mg of PBI membranes were immersed in the TMC/THF or TMC/2-MeTHF solutions at room temperature (about 22° C.). The cross-linked membranes were removed from the cross-linking solution after 24 hours, rinsed by THF or 2-MeTHF four times, and solvent exchanged with fresh isopropyl alcohol (IPA) four times, each time for 30 minutes. Afterwards, the cross-linked membranes were kept in IPA for OSN tests. The membranes labelled as NX—PBI (non cross-linked PBI), X0-PBI (cross-linked using a TMC/THF solution), and X—PBI (cross-linked using a TMC/2-MeTHF solution). Besides, the membranes were conditioned in a 50/50 (weight ratio) PEG 400/IPA solution overnight and air-dried for long-term storage.

Membrane Characterizations (i) Chemistry Analysis

Fourier transform infrared spectroscopy (FTIR) was employed to analyse the chemical changes before and after the cross-linking modification. An attenuated total reflectance (ATR) mode was applied using a Bruker FTIR spectrometer (VERTEX 70/70v) over the range of 400-4000 $cm^{-1}$ with the total 64 scans for each sample. To further investigate the surface chemistry of the PBI membranes before and after the modification, X-ray photoelectron spectroscopy (XPS) was performed using a Kratos AXIS Ultra$^{DLD}$ (Kratos Analytical Ltd., UK). The hydrophilicity of the membranes was investigated by measuring the static water contact angles of dried membranes using a contact angle goniometer (Rame Hart, USA). More than 10 measurements were taken at different locations for each sample to obtain the average value.

(ii) Chemical Stability

To evaluate the chemical stability of the cross-linked PBI membranes in DMAc, several pieces of nonwoven fabrics, NX—PBI, and X—PBI membranes were vacuum dried and weighed. Each nonwoven sample was about 60 mg while NX—PBI and X—PBI samples were about 80 mg before immersion. The samples were separately soaked in 50 ml DMAc for one week at room temperature with stirring. Subsequently, the samples were taken out from the DMAc, washed with DI water and dried under vacuum overnight. Afterwards, their weights were measured and compared with their initial values. The percentage of gel content indicates the membrane stability in DMAc. Also, the UV absorption spectra of the dissolved portion of PBI in DMAc were recorded using a UV-Vis spectrometer (Pharo 300, Merck)

(iii) Morphological Studies

A field-emission scanning electron microscope (FESEM, JEOL JSM-6700F) was employed to examine the top membrane surface and cross-sectional morphologies. Firstly, the membranes were rinsed with deionized (DI) water for several times, frozen in a refrigerator for 5 hours, and then dried for 24 hours using a freeze dryer (S61-Modulyo-D, Thermo Electron Corp.). Subsequently, the freeze-dried membranes were immersed in liquid nitrogen, fractured, and then coated with platinum using an ion sputtering device (JEOL JFC-1300). The membrane surface topologies were characterized using atomic force microscopy (AFM, Bruker Dimension ICON) with a tapping mode (Acoustic AC) at room temperature. For each sample, an area of 5×5 m was scanned at a rate of 1 Hz. Then the scanned results were analyzed using NanoScope Analysis (version 1.5). The obtained mean roughness ($R_a$) was used to quantify the surface roughness.

(iv) Experimental Setup for OSN Tests

Pure solvents, different model solute/IPA solutions with a concentration of 50 ppm, and an L-α-lecithin/hexane solution (2 g/L) were used for OSN tests. All experiments were conducted in a stainless steel dead-end permeation cell with a stirring speed of 600 rpm at a transmembrane pressure of 10 bar. Permeance ($P_s$; LMH/bar) was obtained from the following equations:

$$P_S = \frac{Q}{A \times \Delta P} \qquad (1)$$

where Q (L/h) is the volumetric flow rate of the permeate liquid, A ($m^2$) is the effective filtration area, and $\Delta P$ (bar) is the transmembrane pressure.

Solute rejection, $R_T$ (%), was obtained from Equation 2:

$$R_T(\%) = \left(1 - \frac{c_p}{c_f}\right) \times 100 \qquad (2)$$

where $c_p$ and $c_f$ are the solute concentrations in the permeate and feed solutions, respectively.

The solute concentrations were measured by a UV-Vis spectrometer at different wavelengths based on the solutes. The permeate flow rates, Q (L/h) and solute rejections were measured only after the flux reached a steady state. Three consecutive data with the same volume were measured to ensure the variations of the steady flux and rejection were within 5%.

To test the long-term performance of the X—PBI membrane, the filtration test was conducted using an IPA solution containing 50 ppm tetracycline at 10 bar for 96 hours. The feed solution concentration was always adjusted to keep almost constant during the filtration tests.

Results and Discussion (i) Chemical Analyses

Figure 2:
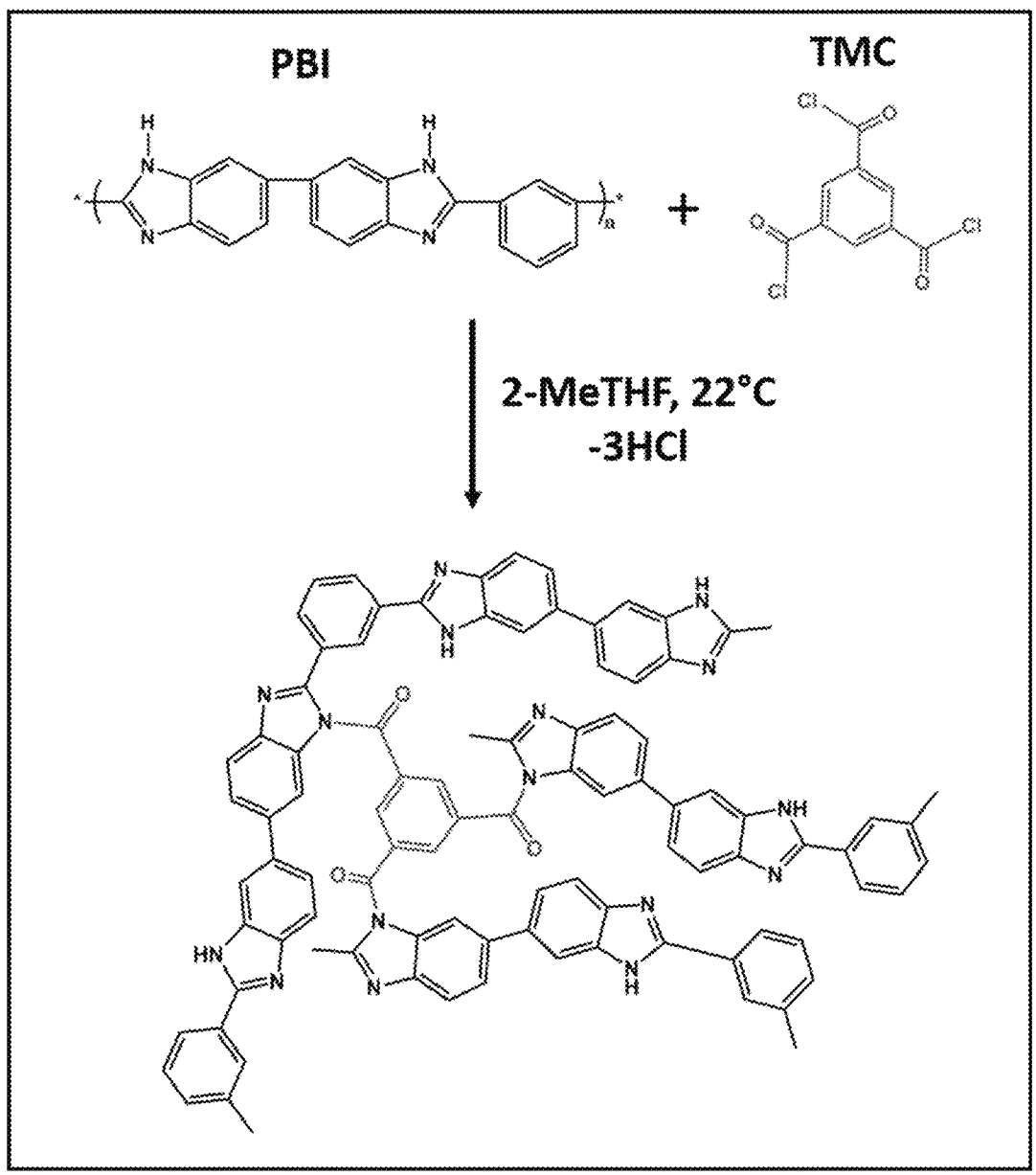
FIG. 2 shows the chemical cross-linking reaction between PBI and TMC in the cross-linked polymeric membrane according to one aspect of the present invention.

FIG. 2 illustrates the cross-linking reaction between PBI and TMC in anhydrous 2-MeTHF at 22° C. The acyl chloride groups of TMC react with the secondary amines on imidazole rings of PBI, forming tertiary amide groups and thus crosslinking the PBI chains.

Figure 3:
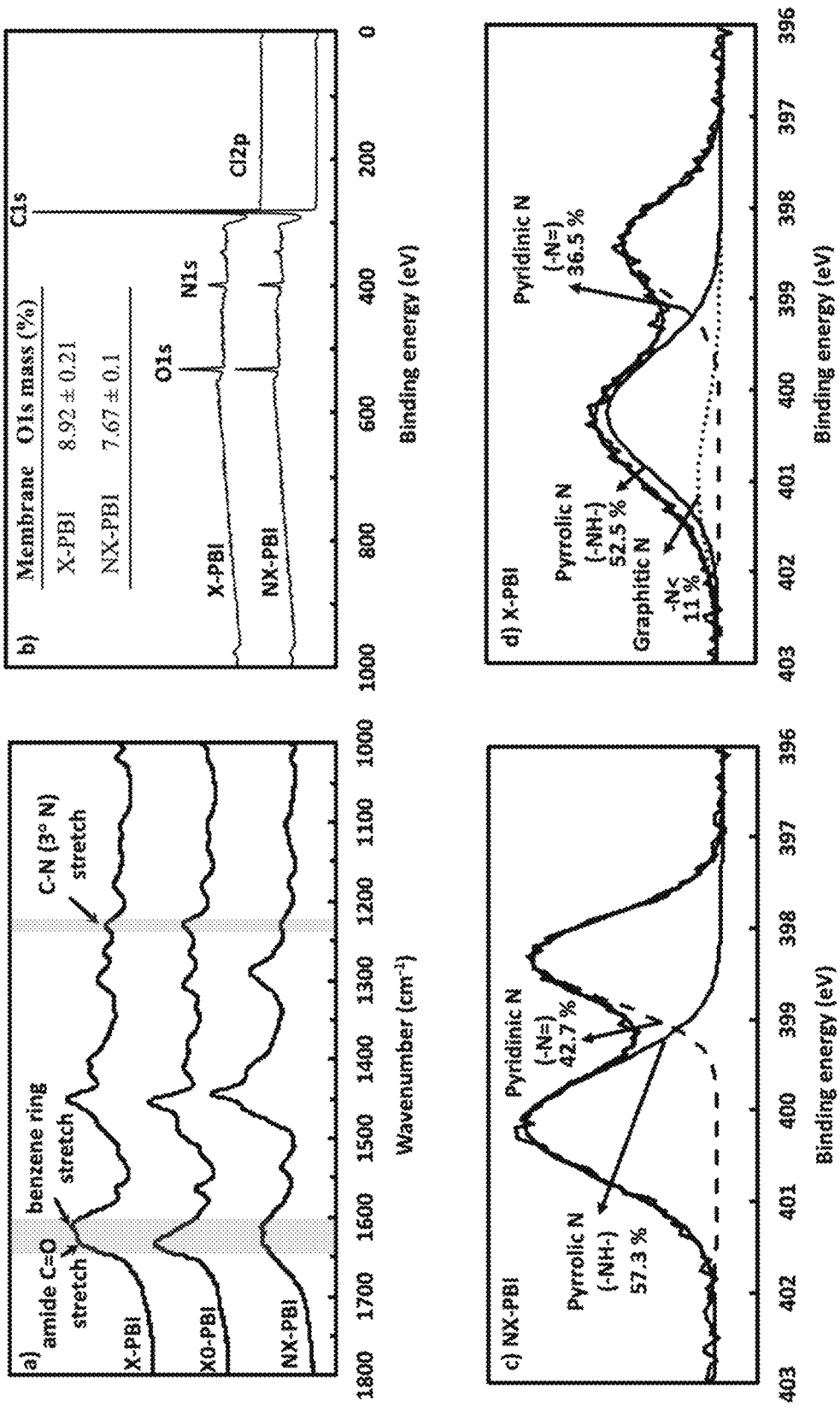
FIG. 3(a) shows the ATR-FTIR spectra of PBI membranes before (NX—PBI) and after (X0-PBI and X—PBI) cross-linking according to one embodiment of the method of the present invention.
FIG. 3(b) shows the XPS spectra on the surface of X—PBI.
FIGS. 3(c) and (d) show the XPS N1s narrow scan spectra on the surfaces of PBI membranes before and after the TMC cross-linking, respectively.

FIG. 3(a) displays the ATR-FTIR spectra of the PBI membranes before (NX—PBI) and after the TMC modification (X0-PBI and X—PBI). The appearance of characteristic peaks for tertiary amides at 1630 cm$^{-1}$ (C=O stretching) and 1225 cm$^{-1}$ (C—N stretching of 3° N) in both X0-PBI and X—PBI confirms the aforementioned reaction between PBI and TMC. The C=O stretching peak of tertiary amides (1630 cm$^{-1}$) appears as a shoulder peak on the strong stretching peak at 1603 cm$^{-1}$ related with benzene rings. Moreover, the existence of C=O groups in TMC may result in the cross-linked membranes with higher hydrophilicity compared to the non cross-linked membranes. The static water contact angle measurements confirm this hypothesis where the contact angle of NX—PBI is 72.4°±2.2° while that of X—PBI is 60.2°±1.9°. Basically, the hydrophilicity of a membrane affects its separation performance because a hydrophilic membrane tends to have higher fluxes for polar solvents.

The evolution of surface chemistry after the TMC modification was also examined by XPS. FIG. 3(b) shows the full survey XPS spectra of X—PBI. FIG. 3(c) and FIG. 3(d) illustrate the N1s narrow scan spectra on the surfaces of NX—PBI and X—PBI, respectively. The peaks at ~398.3, ~400.2, and ~400.9 are related to the pyridinic N, pyrrolic N, and graphitic N, respectively. A comparison between the spectra of NX—PBI and X—PBI membranes reveals that the TMC modification results in a graphitic N peak due to the chemical cross-linking. In addition, the intensity of the pyrrolic N for X—PBI is lower than that in NX—PBI due to the conversion of some pyrrolic N to graphitic N during the TMC cross-linking modification.

(ii) Chemical Stability

Figure 4:
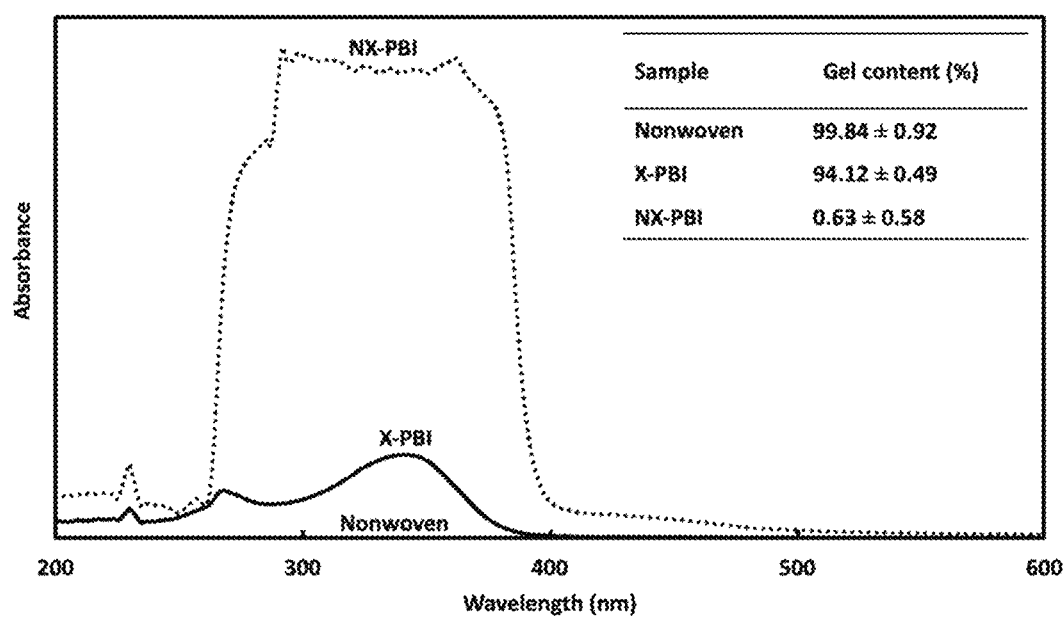
FIG. 4 shows the UV absorption spectra of the dissolved cross-linked polymeric membrane samples in DMAc.

FIG. 4 shows the UV absorption spectra of the dissolved portion of samples in DMAc as well as gel content of the nonwoven, NX—PBI, and X—PBI samples after soaking in DMAc for one week. These UV absorption spectra demonstrate that the nonwoven sample is thoroughly stable in DMAc; however, the non cross-linked PBI (NX—PBI) membrane is completely dissolved. The TMC modified membrane (X—PBI) shows outstanding stability in DMAc where the gel content is ~94%. Clearly, TMC is an effective agent to cross-link the PBI membrane with strong resistance to its original solvent (i.e., DMAc).

(iii) Morphological Studies

Figure 5:
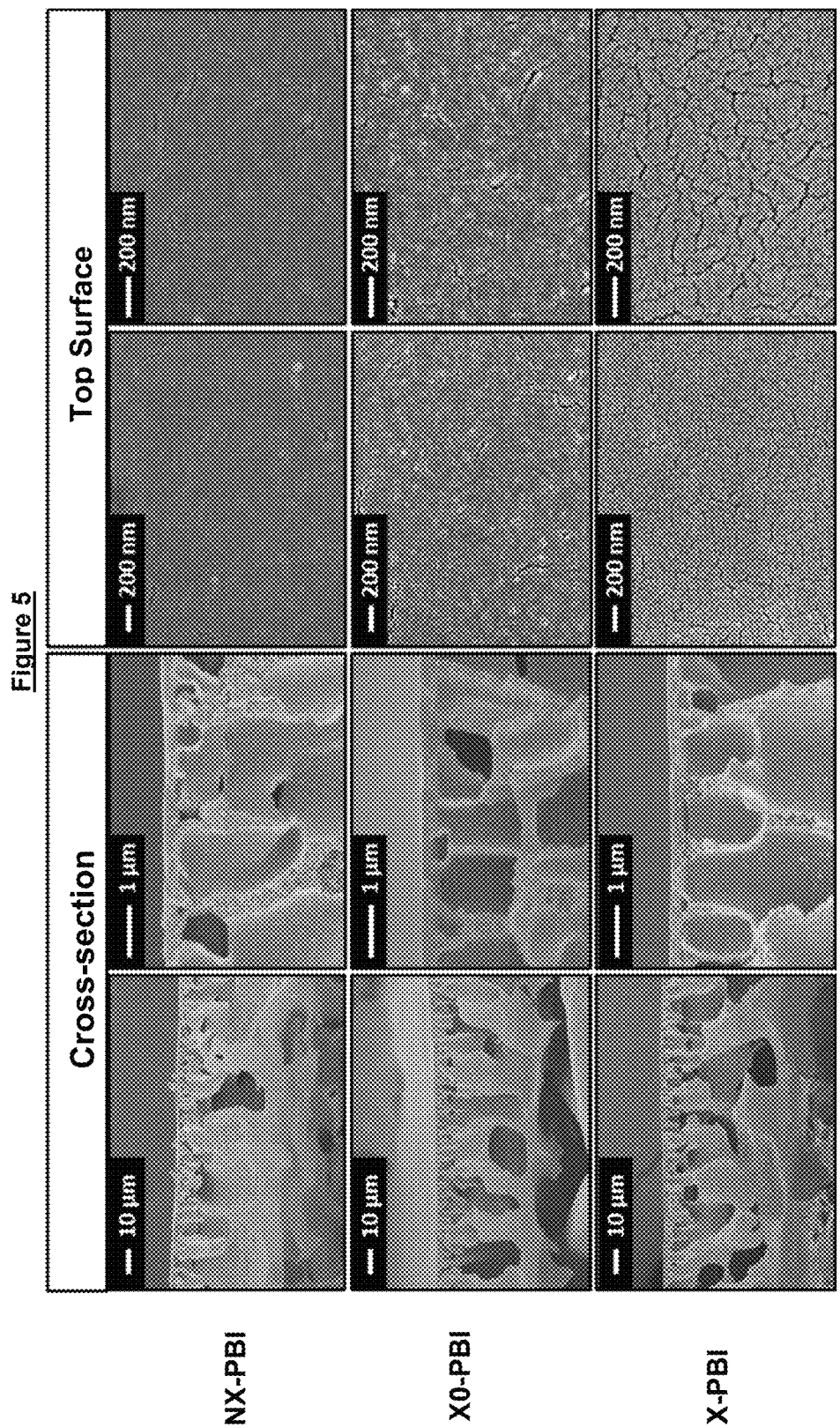
FIG. 5 shows the cross-section and top surface FESEM images of PBI membranes before (NX—PBI) and after (X0-PBI and X—PBI) cross-linking according to one embodiment of the method of the invention.

FIG. 5 shows the cross-section and top surface FESEM images of the non cross-linked PBI (NX—PBI) and cross-linked PBI (X0-PBI and X—PBI) membranes. All membranes exhibit a similar structure consisting of a relatively dense-selective top layer and a highly porous sublayer full of macrovoids. This makes the membrane highly permeable with a reasonable selectivity. There is no apparent change in the cross-section of the PBI membranes after the cross-linking modification; however, the top surface of the cross-linked membranes (X0-PBI and X—PBI) are found to be denser. Further, the cross-linked membrane has a smoother surface than the non cross-linked one due to the relaxation and pore size reduction during the modification.

(iv) Organic Solvent Nanofiltration Performance (a) Various Solvent Permeances and Solute Rejections In order to evaluate the OSN performance of the TMC cross-linked membranes (X—PBI) in both polar and non-polar organic solvents, MeCN, acetone, EtOH, IPA, toluene, and hexane were chosen as comparative solvents. FIG. 6(a) shows the permeance of each solvent.

In general, a solvent with a small kinetic diameter and molar volume, low viscosity and surface tension, and high affinity towards the selective layer, can pass through the membrane with relative ease at a high flux. The X—PBI membranes demonstrate excellent permeances for polar solvents within the range of 40.7 to 5.8 LMH/bar, which follow the order of MeCN>acetone>EtOH>IPA. MeCN has the highest permeance of 40.7 LMH/bar due to its high polarity, low viscosity and surface tension, small molar volume, and the highest affinity to PBI membrane (i.e., $|\delta_{PBI}-\delta_{MeCN}|$=1.0 MPa$^{-1/2}$). In contrast, IPA has the lowest permeance of 5.8 LMH/bar because it has the highest viscosity of these 5 polar solvents in addition to high surface tension, large kinetic diameter and molar volume. For non-polar solvents, toluene shows a low permeance of 2.2 LMH/bar due to its high surface tension, large kinetic diameter and molar volume. It also has low affinity to the PBI membrane (i.e., $|\delta_{PBI}-\delta_{Toluene}|$=4.8 MPa$^{-1/2}$). However, hexane has a surprisingly high permeance of 80.8 LMH/bar because of its low viscosity, small surface tension and kinetic diameter. These characteristics facilitate its transport through the membrane regardless of its poor affinity to the PBI membrane (i.e., $|\delta_{PBI}-\delta_{Hexane}|$=8.4 MPa$^{-1/2}$).

Figure 6:
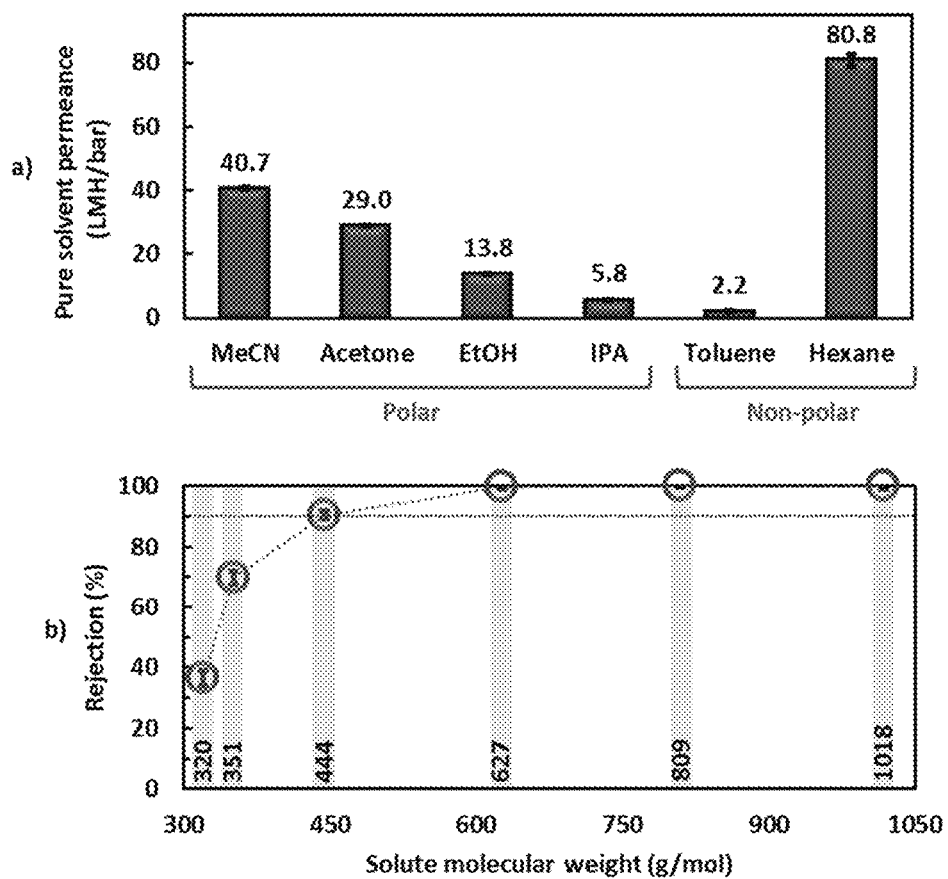
FIG. 6(a) shows the pure solvent permeances and FIG. 6(b) shows the rejections of the cross-linked PBI membrane (X—PBI) according to one embodiment of the present invention to different solutes in IPA solution.
Figure 7:
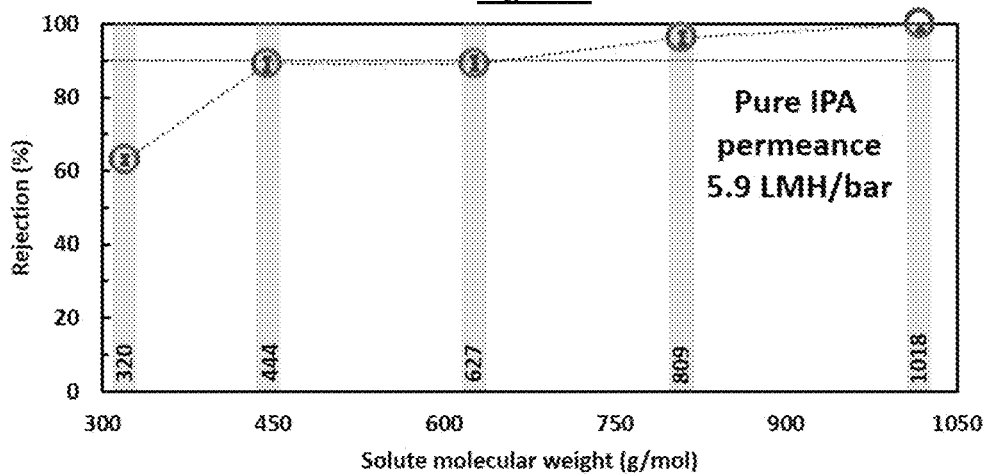
FIG. 7 shows the rejections of the cross-linked PBI membrane (X0-PBI) according to one embodiment of the present invention to different solutes in IPA solution.

FIG. 6(b) shows the rejection of the X—PBI membrane as a function of solute molecular weight in IPA solutions. IPA is used as the solvent for rejection experiments due to an existing trend to shift the commonly used organic solvents in industry, from toxic and hazardous solvents to "greener" substitutes such as ethanol and IPA. The X—PBI membranes exhibit excellent rejections (~100%) to solutes with molecular weights of higher than 600 g/mol. The calculated molecular weight cutoff (MWCO) of the X—PBI membrane is almost 440 Da; however, the MWCO of the X0-PBI membrane is larger than 600 Da (FIG. 7). Also, the pure IPA permeance for both X—PBI and X0-PBI membranes are almost the same (5.8 vs. 5.9 LMH/bar). Based on FIGS. 6 and 7, the TMC/2-MeTHF cross-linking solution results in a smaller MWCO for PBI membranes without scarifying the permeability of the membranes as compared with the TMC/THF cross-linking solution.

(b) 2-Step Tetracycline/IPA Filtration

Figure 8:
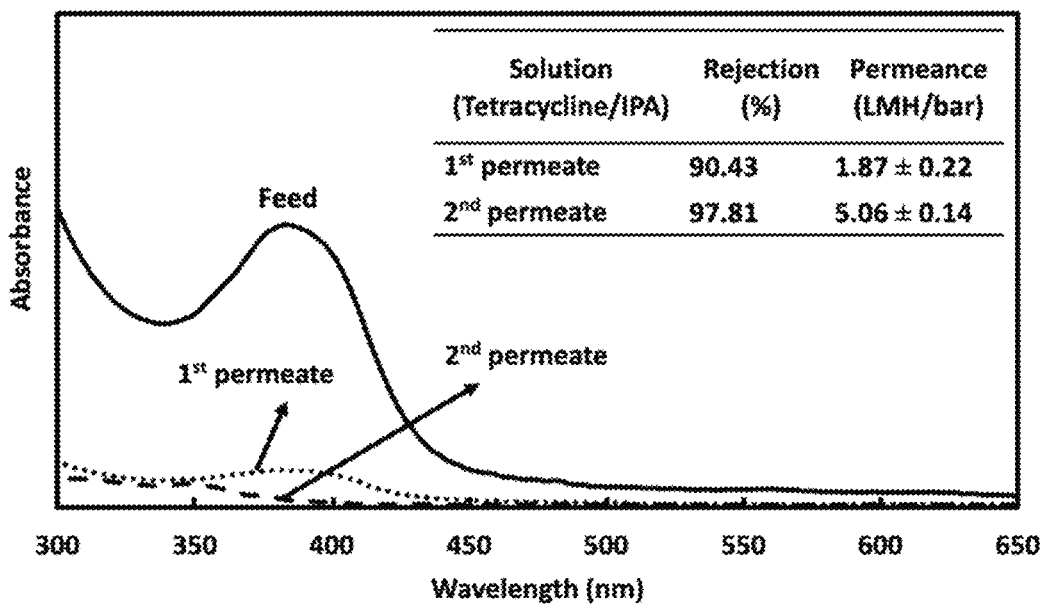
FIG. 8 shows the UV absorption spectra of the tetracycline/IPA feed, 1st permeate, and 2nd permeate and a table containing separation performances of the permeates for 2-step filtration.

Recycling mother liquor and concentrating pharmaceuticals with less energy consumption is one of the most important OSN applications. To investigate the potential application of cross-linked PBI membranes in the pharmaceutical industry, the X—PBI membranes were tested by filtrating a tetracycline/IPA solution. FIG. 8 shows the UV absorption spectra of the tetracycline/IPA feed, $1^{st}$ and $2^{nd}$ permeates of the cross-linked PBI (X—PBI) membrane. In the $1^{st}$ step of filtration, more than 90% of tetracycline molecules were rejected by the X—PBI membrane; thus, the tetracycline concentration in the $1^{st}$ permeate became lower than 5 ppm. In the $2^{nd}$ step of filtration, where the 1st permeate was used as the feed, the membrane showed a superb rejection of 97.81% to tetracycline molecules. The permeances of the $1^{st}$ and $2^{nd}$ filtration steps were 1.87 and 5.06 LMH/bar, respectively, indicating the huge influence of the feed concentration on separation performance. This observation was in good agreement with previous reports, where both concentration polarization and osmotic pressure were found to play significant roles in determining the separation performance of OSN. Accordingly, a high rejection and flux would be observed if the feed concentration is low.

(c) L-α-Lecithin/Hexane Filtration

Figure 9:
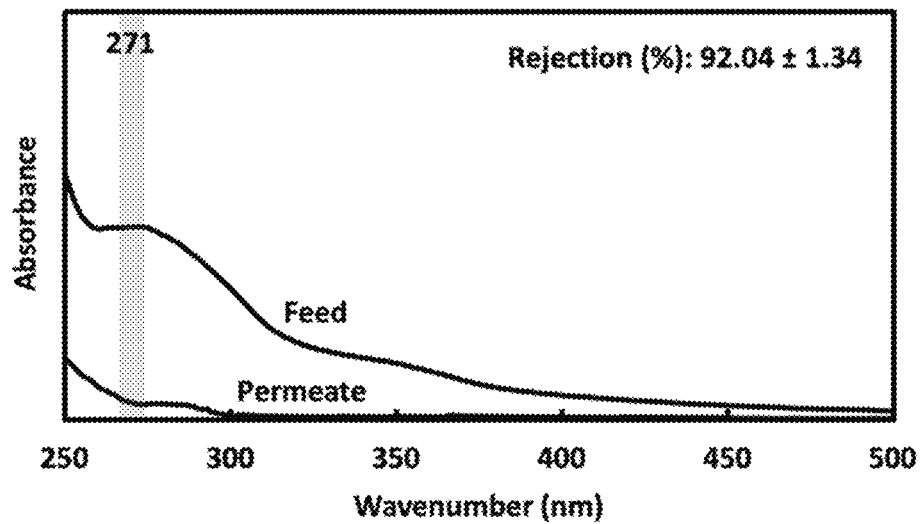
FIG. 9 shows the UV absorption spectra of the L-α-lecithin/hexane feed and permeate solutions.

To explore a possible application of X—PBI membranes in the food industry, 2 g of L-α-lecithin as a common food additive was dissolved in 1 L of hexane and filtered through the X—PBI membranes. FIG. 9 shows the UV absorption spectra of the L-α-lecithin/hexane feed and permeate solutions. The membrane rejected 92% of L-α-lecithin with a high hexane permeance of 80.8 LMH/bar. Clearly, the X—PBI membranes have potential to concentrate L-α-lecithin in mother liquor and cut down the energy cost for the evaporation of hexane.

(d) Mixed Dyes Separation

Figure 10:
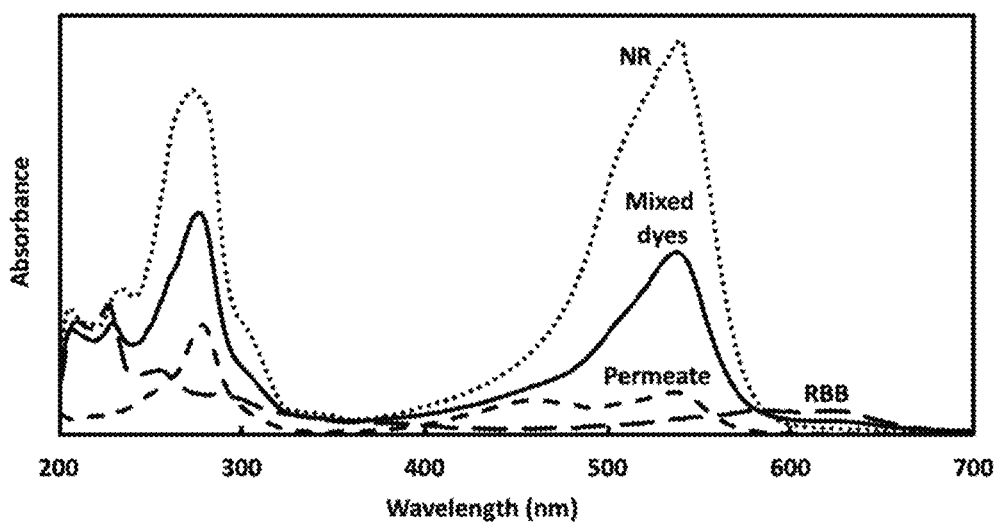
FIG. 10 shows the UV absorption spectra of pure dye solutions, mixed dyes, and permeate solutions.

To prove that the X—PBI membrane has shape-selective functions and precise molecular sieving features, separation of mixed dyes was also conducted using a mixture of NR (red) and RBB (blue) in IPA. The dark feed colour became orange or light red. The UV absorption spectra as shown in FIG. 10 confirm that RBB is almost entirely rejected, while NR still selectively passes through the X—PBI membrane. This remarkable separation performance results from the fact that RBB (15.8×11.9 Å) has a 3D bulky structure, while NR (12.6×5.9 Å) has a slim one. As a result, RBB is fully blocked, but the slender NR molecules with a diameter of 5.9 Å passes through the X—PBI membrane. Therefore, the X—PBI membrane has potential to selectively separate small molecules and may be used in dye separation, monomer purification, solutes fractionation and other industrial applications involving organic solvents.

(e) 96-Hour Separation Performance of Tetracycline/IPA Mixtures

Figure 11:
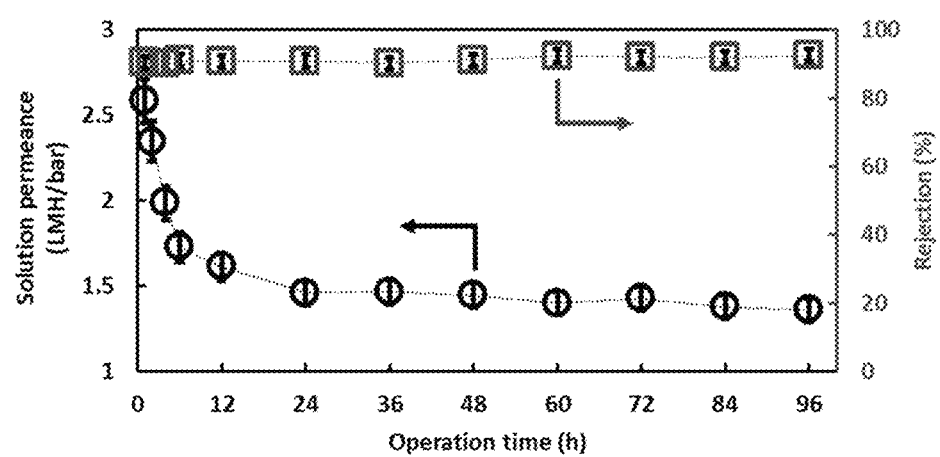
FIG. 11 shows the 96-hour separation performance of tetracycline/IPA solution using the membrane according to one embodiment of the present invention.

The durability of OSN membranes in long-term tests is an important performance index in practical applications. By using a 50 ppm tetracycline/IPA solution as the feed, the X—PBI membrane was tested for 96 hours under a dead-end filtration mode. FIG. 11 shows the results. In particular, the IPA permeance dropped sharply within the first 6 hours and then slightly declined until 96 hours, while the tetracycline rejection slightly increased during the entire 96 hours. The initial permeance decline may be attributed to the membrane compaction, stabilization and/or pore blockage due to the solute entrapments. After the initial 6 hours, the membrane permeance and rejection become more stable. The steady IPA permeance and tetracycline rejection are 1.36 LMH/bar and 92.6%, respectively. These results indicate that the membranes of the present invention possess great potential for real OSN applications with exceptional separation performance arising from their robust structure and adequate solvent resistance.

Comparative Data

A comparison between the X—PBI membrane and other OSN membranes for the separation of different solutes and solvents is tabulated in Table 1. The X—PBI membrane exhibits much higher permeances and rejections compared to commercial OSN membranes and other reported PBI membranes.

TABLE 1

Comparison of separation performance of different PBI membranes compared to X-PBI

| Membrane | Pressure (bar) | Solvent | Permeance (LMH/bar) | Solute | Solute MW (g/mol) | Rejection (%) | Reference |
|---|---|---|---|---|---|---|---|
| MPF-50[a] | 6 | EtOH | 4.2 | Raffinose | 504 | 41 | (1) |
| STARMEM ™ 122[b] | 30 | EtOH | 2.4 | Sudan Black | 456 | 94.1 | (2) |
| PBI-GA | 6 | EtOH | 3.7 | Sudan IV | 380 | 50 | (3) |
| PBI-DEO | | | 1 | | | 55 | |
| PBI-DBX | 10 | MeCN | 11 | PEG | 400 | 42 | (4) |
| | | DMF | 6 | | | 37 | |
| PBI-DBB | | MeCN | 7 | | | 25 | |
| | | DMF | 1 | | | 10 | |
| PBI-PXDC | 25 | EtOH | 0.3 | Crystal violet | 408 | 75.7 | (5) |
| | | IPA | 0.03 | | | 99.9 | |
| DuraMem ®500[c] | 10 | IPA | 1.6 | Tetracycline | 444 | 71.4 | This work |
| X-PBI | 10 | MeCN | 40.7 | Fast green FCF | 809 | 99.9 | This work |
| | | Acetone | 29 | RBB | 627 | 99.6 | |
| | | EtOH | 13.8 | Tetracycline | 444 | 90.4 | |
| | | IPA | 5.8 | Safranin O | 351 | 69.8 | |
| | | Hexane | 80.8 | L-α-lecithin | 758 | 92 | |

Key:
[a, b, c]-Commercial OSN membranes
Ref 1-J Geens et al, Journal of Membrane Science, 2005, 255:255-264
Ref 2-S Darvishmanesh et al, Physical Chemistry Chemical Physics, 2010, 12:13333-13342
Ref 3-D Y Xing et al, Green Chemistry, 2014, 16:1383-1392
Ref 4-I B Valtcheva et al, Journal of Membrane Science, 2014, 457:62-72
Ref 5-D Chen et al, RSC Advances, 2016, 6:16925-16932

Conclusion

The present invention provides an environmentally friendly cross-linking method to form cross-linked polymeric membranes. In particular, a cross-linker such as trimesoyl chloride (TMC) may be used with a solvent such as 2-methyl tetrahydrofuran (2-MeTHF) to fabricate cross-linked polymeric membranes such as polybenzimidazole (PBI) membranes for OSN.

In particular, as can be seen from the example, the cross-linked PBI (X—PBI) membrane may possess a denser, smoother, and more hydrophilic surface as compared with the non cross-linked PBI (NX—PBI) membrane. For example, the X—PBI membrane exhibited an excellent rejection of 99.6% to remazol brilliant blue R (MW of 627 g/mol). It had pure acetonitrile, acetone, ethanol and isopropanol permeances of 40.7, 29.0, 13.8, and 5.8 LMH/bar at 10 bar, respectively.

Further, the X—PBI membrane had superlative performance during 2-step filtration of tetracycline with a MW of 444 g/mol. The membrane had rejections of 90.4% and 97.8% of the compound in the first and second steps of the filtration, respectively. Moreover, the X—PBI membrane was able to concentrate L-α-lecithin with a MW of 758.08 in hexane solutions with a L-α-lecithin rejection of 92% and a pure hexane permeance of 80.8 LMH/bar at 10 bar. The X—PBI membrane also had precise shape-selective functions for mixed dyes separation. The X—PBI membranes also exhibited promising performance for the separation of tetracycline/IPA mixtures in 96-hour tests, representing its potential for industrial OSN applications.

Whilst the foregoing description has described exemplary embodiments, it will be understood by those skilled in the technology concerned that many variations may be made without departing from the present invention.

The invention claimed is:

1. A method of forming a cross-linked polymeric membrane comprising:
    providing a polymeric membrane formed from at least one polymer comprising at least one imidazole ring; and
    contacting the polymeric membrane with a cross-linking solution comprising at least one cross-linker to form the cross-linked polymeric membrane, wherein the at least one cross-linker comprises at least three acyl halide groups,
    wherein the cross-linking solution comprises the at least one cross-linker dissolved in a solvent, and wherein the solvent is: 2-methyl tetrahydrofuran (2-MeTHF), tetrahydrofuran (THF), cyclopentyl methyl ether (CPME), or mixtures thereof.

2. The method according to claim 1, wherein the at least one cross-linker is: trimesoyl chloride (TMC).

3. The method according to claim 1, wherein the contacting is for a pre-determined period of time and at a pre-determined temperature.

4. The method according to claim 3, wherein the pre-determined temperature is 10-40° C. and/or the pre-determined period of time is 0.5-120 hours.

5. The method according to claim 1, wherein the method further comprises forming the polymeric membrane from a polymeric solution comprising at least one polymer prior to the providing.

6. The method according to claim 1, wherein the cross-linking solution comprises 0.05-20% (weight/weight) of the at least one cross-linker.

7. The method according to claim 1, wherein the cross-linked polymeric membrane has a thickness of 1-1000 μm.

8. The method according to claim 1, wherein the cross-linked polymeric membrane is hydrophilic.

* * * * *